(12) United States Patent
Mazzouji et al.

(10) Patent No.: US 8,684,694 B2
(45) Date of Patent: Apr. 1, 2014

(54) WHEEL FOR A HYDRAULIC MACHINE, A HYDRAULIC MACHINE INCLUDING SUCH A WHEEL, AND AN ENERGY CONVERSION INSTALLATION EQUIPPED WITH SUCH A HYDRAULIC MACHINE

(75) Inventors: Farid Mazzouji, Vourey (FR); Michel Henri Couston, Seyssins (FR); Jean Bernard Houdeline, Chirens (FR); Sylvain Lavigne, Eybens (FR); Claire Segoufin, Grenoble (FR)

(73) Assignee: Alstom Renewable Technologies, Grenoble (FR)

( * ) Notice: Subject to any disclaimer, the term of this patent is extended or adjusted under 35 U.S.C. 154(b) by 758 days.

(21) Appl. No.: 12/866,837

(22) PCT Filed: Feb. 13, 2009

(86) PCT No.: PCT/FR2009/050231
§ 371 (c)(1),
(2), (4) Date: Aug. 9, 2010

(87) PCT Pub. No.: WO2009/101371
PCT Pub. Date: Aug. 20, 2009

(65) Prior Publication Data
US 2011/0008150 A1    Jan. 13, 2011

(30) Foreign Application Priority Data

Feb. 15, 2008  (FR) ..................................... 08 50995

(51) Int. Cl.
*F01D 5/04*    (2006.01)
*F03B 3/02*    (2006.01)

(52) U.S. Cl.
USPC ........................................ 416/186 R; 416/203

(58) Field of Classification Search
USPC .......... 415/175, 203; 416/179, 182, 183, 185, 416/186 R, 223 B
See application file for complete search history.

(56) References Cited

U.S. PATENT DOCUMENTS 6,340,291 B1 * 1/2002 Reckert .......................... 416/185
7,905,703 B2 * 3/2011 Cruickshank et al. ..... 415/199.2

FOREIGN PATENT DOCUMENTS

| EP | 0356821 | 3/1990 |
|---|---|---|
| FR | 2011959 | 3/1970 |
| GB | 1277416 | 6/1972 |
| JP | 2005048608 | 2/2005 |

* cited by examiner

*Primary Examiner* — Nathaniel Wiehe
*Assistant Examiner* — Brian O Peters
(74) *Attorney, Agent, or Firm* — Buchanan Ingersoll & Rooney PC

(57) ABSTRACT

The invention relates to a wheel (R) of the Francis type that comprises a ring (1) with revolution symmetry about the rotation axis (Z) of the wheel (R), and curved blades (21, 22) connected to the ring (1) and each having an outer peripheral edge (212, 222) and an inner central edge (211, 221). The connection points ($B_{21}$, $B_{22}$) between the ring (1) and the inner central edges (211, 221) of the blades (21, 22) are located on a same circle ($C_{20}$) centered on the axis (Z). The connection points ($A_{21}$, $A_{22}$) between the ring (1) and the outer peripheral edges (212, 222) of the blades (21, 22) are located on at least two distinct circles ($C_{21}$, $C_{22}$) ($D_{21}$, $D_{22}$) centered on the axis (Z).

8 Claims, 5 Drawing Sheets

WHEEL FOR A HYDRAULIC MACHINE, A HYDRAULIC MACHINE INCLUDING SUCH A WHEEL, AND AN ENERGY CONVERSION INSTALLATION EQUIPPED WITH SUCH A HYDRAULIC MACHINE

BACKGROUND OF THE INVENTION

1. Field of the Invention

The present invention relates to a wheel of the Francis type for a hydraulic machine, which wheel is designed to pass a forced flow of water. Such a flow drives the wheel in rotation when the machine is a turbine. Such a flow results from said rotation when the machine is a pump. The present invention also relates to a hydraulic machine including such a wheel. The present invention also relates to an energy conversion installation equipped with such a hydraulic machine.

2. Brief Description of the Related Art

Document JP-A-2005 48608 describes a wheel or "runner" for a hydraulic machine of the pump-turbine type. That wheel has an axisymmetric band and a plurality of curved blades that are secured to or integral with the band and each of which has an outside peripheral leading edge and an inside central trailing edge. The connections via which the band is connected to the inside central edge of every other blade are situated on a first circle of large radius, whereas the connections via which the band is connected to the inside central edge of each blade adjacent to said every other blade are situated on a second circle that is of smaller radius. In the outside peripheral region of the wheel, the connections via which the band is connected to the blades having their inside central edges lying on the first circle are situated on the periphery of the band, whereas the connections via which the band is connected to the blades adjacent to those blades and having their central edges lying on the second circle of small radius are situated set back from the periphery of the band. That particular shape for the wheel of JP-A-2005 48 608 is designed to reduce the cavitation arising at the inlet of the turbine, i.e. at the periphery of the wheel, while the hydraulic machine is operating at steady speeds, so as to increase its hydraulic efficiency at steady speeds.

In a prior art hydraulic machine, at transient speeds that occur after starting, or before stopping in turbine mode, the wheel is subjected to rotating and asynchronous radial forces that tend to "skew" it. At transient speeds, those radial forces exerted on the wheel give rise to mechanical stress levels that can be very high and that therefore determine the dimensioning of the components of the hydraulic machine, such as the shaft or the bearings thereof. The cost of those components is thus necessarily increased due to such radial forces.

SUMMARY OF THE INVENTION

A particular object of the present invention is to remedy that drawback, by proposing a wheel of a shape that attenuates, or indeed avoids, the generation of rotating radial forces at transient speeds.

To this end, the invention provides a wheel of the Francis type for a hydraulic machine designed to pass a forced flow of water, said wheel comprising:
- a band that is circularly symmetrical about the axis of rotation of the wheel; and
- a plurality of curved blades that are secured to or integral with the band and each of which has an outside peripheral edge and an inside central edge;

said wheel being characterized in that the connection points at which the band is connected to the inside central edges of the blades are substantially situated on a common circle that is centered on said axis and in that the connection points at which the band is connected to the outside peripheral edges of the blades are situated on at least two distinct circles that are centered on said axis.

Such a shape for the wheel imparts azimuthal asymmetry, thereby significantly reducing the radial forces to which the wheel is subjected at transient speeds.

According to other advantageous but optional characteristics of the invention, taken in isolation or in any technically feasible combination:
- the connection points at which the band is connected to the outside peripheral edges of the blades are situated on two distinct circles centered on said axis, "long" blades having connection points situated on a first circle, and "short" blades having connection points situated on a second circle of diameter smaller than the diameter of the first circle;
- the wheel further comprises a crown that is circularly symmetrical about said axis and that is situated facing said band, the blades being secured to or integral with the crown, the connection points at which the crown is connected to the inside central edges of the blades are situated on a common circle centered on said axis, and the connection points at which the crown is connected to the outside peripheral edges of the blades are situated on at least two distinct circles that are centered on said axis;
- the connection points at which the crown is connected to the outside peripheral edges of the blades are situated on two distinct circles that are centered on said axis;
- the short blades are distributed uniformly about said axis and the long blades are distributed uniformly about said axis;
- the wheel has nine blades, including six long blades and three short blades, the short blades being disposed on the band with angular spacing of 120°;
- the wheel has an even number of blades and every other blade is a short blade; and
- each short blade has a developed length lying in the range 50% of the developed length of a long blade to 99% of the developed length of a long blade, and preferably in the range 70% of said developed length of a long blade to 85% of said developed length of a long blade.

The invention also provides a hydraulic machine, characterized in that it includes a wheel as defined above.

The components of a hydraulic machine of the invention may therefore be dimensioned for lower mechanical stresses, and thus for lower cost, while retaining equal performance.

The invention also provides an energy conversion installation that is equipped with at least one hydraulic machine as defined above.

An energy-conversion installation of the invention is thus less costly than prior art installations while offering equal performance.

BRIEF DESCRIPTION OF THE DRAWINGS

The invention can be better understood and other advantages of the invention also appear from the following description, given by way of non-limiting example and with reference to the accompanying drawings, in which.

DESCRIPTION OF THE PREFERRED EMBODIMENTS

Figure 1:
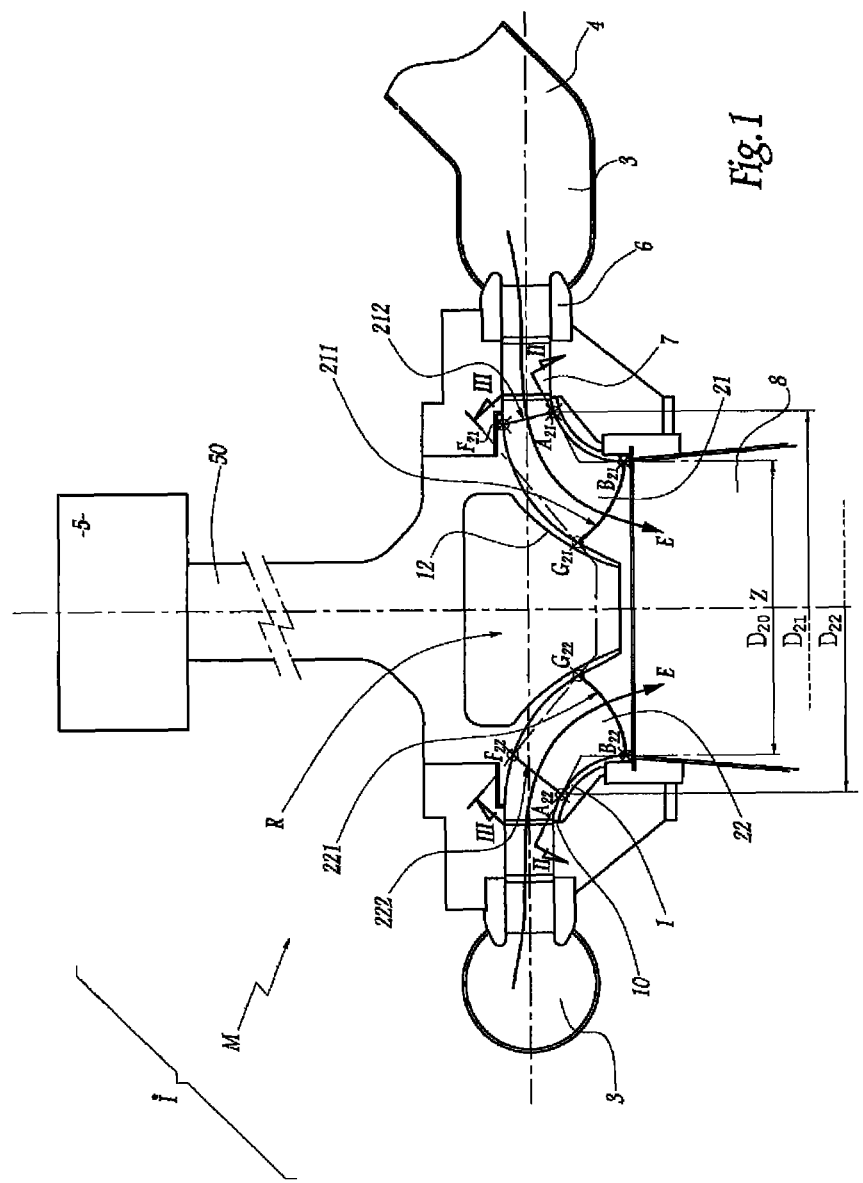
FIG. 1 is a section view showing the principle of an energy conversion installation of the invention, equipped with a hydraulic machine of the invention including a wheel of the invention.

The installation i shown in FIG. 1 includes a reversible hydraulic machine M that is a Francis-type pump turbine whose wheel or "runner" R is fed with water from a casing 3 into which a forced-flow duct 4 opens out. In operation, the wheel R rotates about an axis of rotation Z that is vertical. In order to generate electricity in turbine mode, the machine M is coupled to an alternator 5 via a shaft 50 that rotates about the axis Z. Between the casing 3 and the wheel R there are disposed static stay vane blades 6 and steerable wicket gates 7 whose function is to guide a flow and to regulate the flow-rate of water E that is coming from the duct 4 and that is to pass through the wheel R towards a discharge conduit 8.

Figure 2:
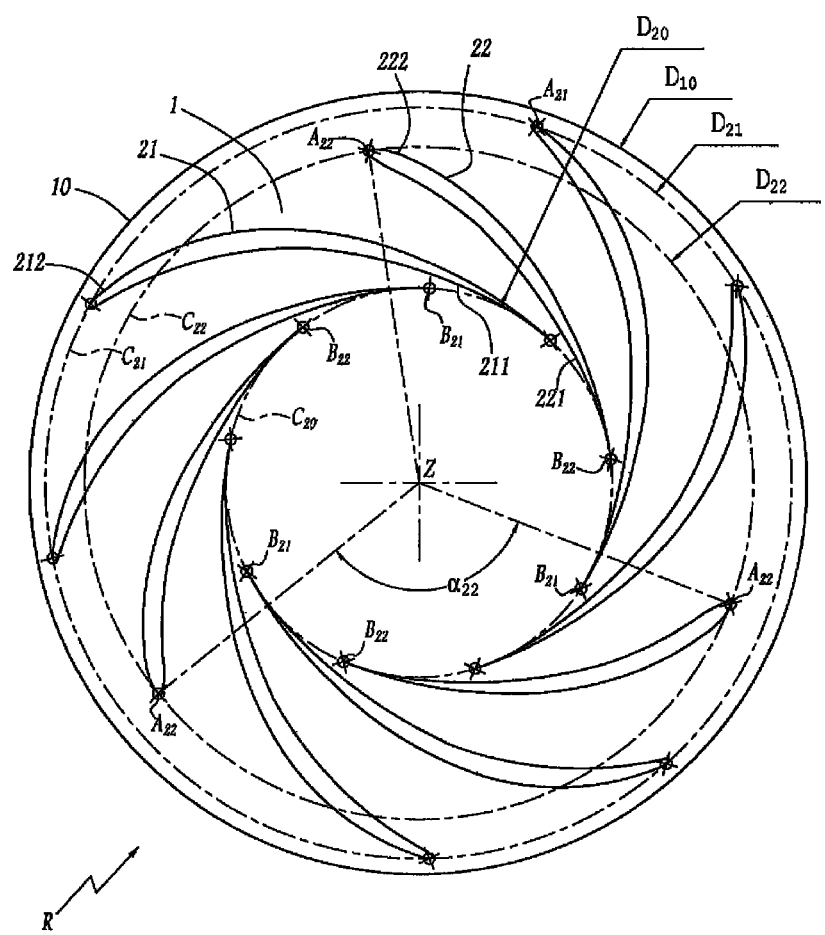
FIG. 2 is a diagrammatic section view of the wheel on its own on the broken line II in FIG. 1.
Figure 3:
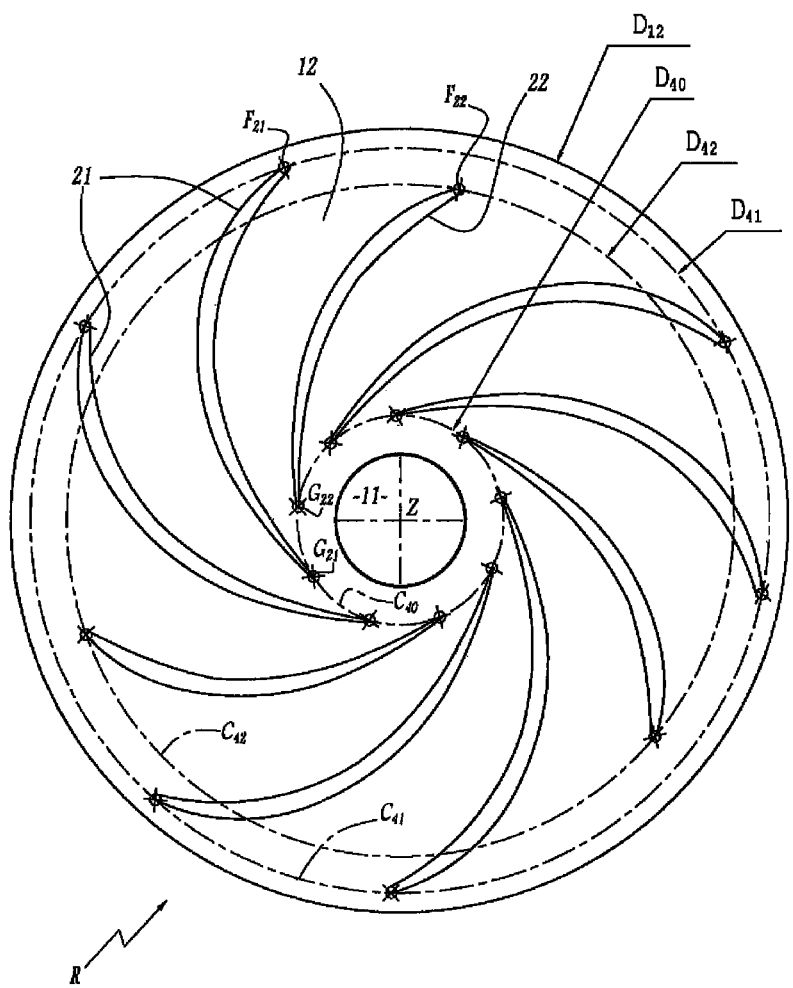
FIG. 3 is a diagrammatic section view of the wheel on the broken line III of FIG. 1.
Figure 4:
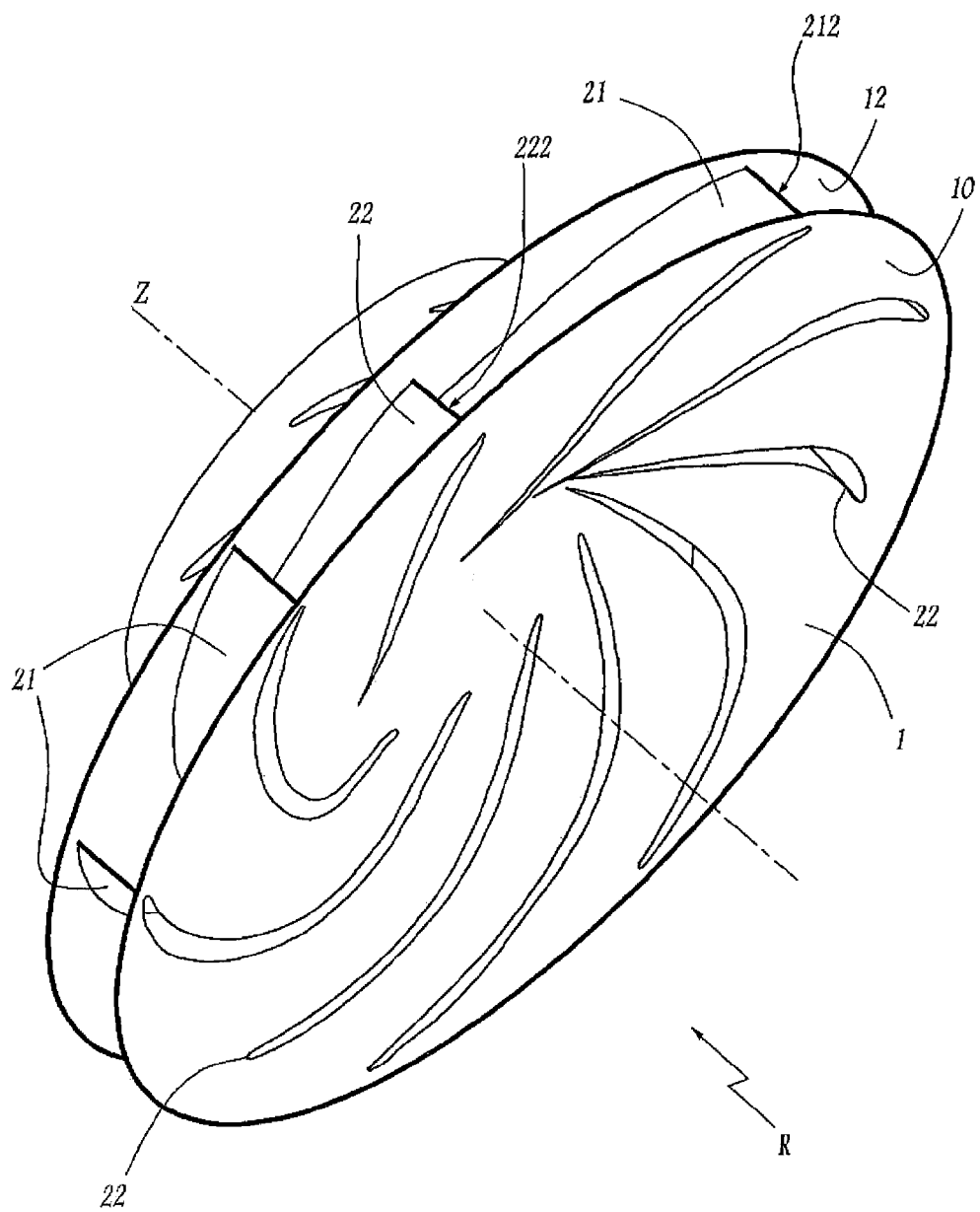
FIG. 4 is a view in partial perspective of the wheel of FIG. 2.

FIG. 2 shows a portion of the wheel R that includes a band 1 that is circularly symmetrical about the axis Z. The band 1 has an outside peripheral edge 10 of diameter $D_{10}$. FIG. 3 shows a portion of the wheel R that includes a crown 12 that defines a central hole 11. The crown 12 is also circularly symmetrical about the axis Z and it is situated facing the band 1. The diameter of the outside peripheral edge of the crown 12 is referenced $D_{12}$. The outside peripheral edge 10 and the central hole 11 are centered on the axis Z. As shown in FIGS. 1 and 4, the surfaces of the band 1 and of the crown 12 have skew shapes, generated by rotating a curve segment about and distant from the axis Z. Any shape for a band and for a crown of a conventional wheel of the Francis-type is adapted to define the respective surfaces of the band and of the crown of a wheel of the invention.

The wheel R also includes nine blades 21 and 22 secured to or integral with the band 1 and secured to or integral with the crown 12 and that extend between the band 1 and the crown 12 about the axis Z, as shown by FIG. 4. Each blade 21 or 22 has a curved shape and is substantially in the shape of a portion of a spiral. Any conventional blade curvature can be suitable for defining the curvature of a blade 21 or 22. Each blade 21 or 22 has a peripheral edge, respectively 212 and 222, situated at the periphery of the band 1 and a central edge, respectively 211 and 221, facing towards the axis Z. In this example, an object is said to be "central" when it is situated in the vicinity of the axis Z, in opposition to the adjective "peripheral" that designates an object that is remote from the axis Z.

When the wheel R operates in turbine mode, the outside peripheral edge 212 or 222 forms a leading edge of a blade 21 or 22, and the inside central edge 211 or 221 forms its trailing edge. The description given below for the turbine mode uses these expressions "leading edge" and "trailing edge"; it can be transposed to when the wheel operates in pump mode by interchanging these expressions.

Of the nine blades 21 and 22 of the wheel R, three blades 22 are of developed length less than the developed length of the other six blades 21. The blades 22 are thus said to be "short", while the blades 21 are said to be "long"

In a central region of the band 1, the points at which the band 1 is connected to the trailing edges 211 and 221 of the respective blades 21 and 22 are respectively referenced $B_{21}$ and $B_{22}$. The points $B_{21}$ and $B_{22}$ are situated on a common central circle of diameter $D_{20}$ centered on the axis Z. Thus, all of the blades 21 and 22 extend to the central circle $C_{20}$ of diameter $D_{20}$.

In a peripheral region of the band 1, the points at which the band 1 is connected to the leading edges 212 of the long blades 21 are referenced $A_{21}$. The points $A_{21}$ are situated on a first circle $C_{21}$ of diameter $D_{21}$ centered on the axis Z. Similarly, the points at which the band 1 is connected to the leading edges 222 of the short blades 22 are referenced $A_{22}$. The points $A_{22}$ are situated on a second circle $C_{22}$ that is centered on the axis Z and that is of diameter $D_{22}$ less than the diameter $D_{21}$ of the first circle. The points $A_{21}$ are thus closer to the edge 10 of the band 1 than are the points $A_{22}$. The respective diameters $D_{21}$ and $D_{22}$ of the first and second circles $C_{21}$ and $C_{22}$, and the diameter $D_{20}$ of the central circle $C_{20}$ are less than the diameter $D_{10}$ of the edge 10.

In other words, the short blades 22 do not extend as far towards the edge 10 of the band 1 as the long blades 21 do. That is why the developed length of the short blades 22 is less than the developed length of the long blades 21. Thus, the respective points $A_{21}$ and $A_{22}$ of the blades 21 and 22 are situated on two distinct circles $C_{21}$ and $C_{22}$ that are centered on the axis Z and that are of different respective diameters $D_{21}$ and $D_{22}$.

In a variant of the invention that is not shown, the points at which the band is connected to the leading edges may be situated on more than two distinct circles, e.g. on three circles.

FIG. 3 shows the locations of the blades 21 and 22 on the crown 12 of the wheel R. Analogously to the connection of the band 1 to the blades 21 and 22, in the central region of the crown 12, the points at which the crown 12 is connected to the trailing edges 211 and 221 of the respective blades 21 and 22 are referenced respectively $G_{21}$ and $G_{22}$. The points $G_{21}$ and $G_{22}$ are situated on a common central circle $C_{40}$ that is of diameter $D_{40}$ and that is centered on the axis Z. Thus, all of the blades 21 and 22 extend to a common central circle $C_{40}$ of diameter $D_{40}$.

In a peripheral region of the crown 12, the points at which the crown 12 is connected to the leading edges 212 of each long blade 21 are referenced $F_{21}$. The points $F_{21}$ are situated on a third circle $C_{41}$ that is of diameter $D_{41}$ and that is centered on the axis Z. Similarly, the points at which the crown 12 is connected to the leading edges 222 of each short blade 22 are referenced $F_{22}$. The points $F_{22}$ are situated on a fourth circle $C_{42}$ centered on the axis Z and of diameter $D_{42}$ less than the diameter $D_{41}$ of the third circle.

In practice, depending on the desired power for the hydraulic machine equipped with the wheel R, the diameter $D_{10}$ of the edge 10 of the band 1 may lie in the range 0.4 m to 10 m. Depending on the dimensions selected for the band 1, the diameter $D_{21}$ of the first circle may represent in the range 90% of the diameter $D_{10}$ to 100% thereof, and the diameter $D_{22}$ of the second circle may represent in the range 70% of the diameter $D_{21}$ to 99% thereof, and preferably in the range 80% of the diameter $D_{21}$ to 95% thereof. Depending on the dimensions selected for the crown 12, the diameter $D_{41}$ of the third circle may represent in the range 90% of the diameter $D_{12}$ to 100% thereof, and the diameter $D_{42}$ of the fourth circle may represent in the range 70% of the diameter $D_{41}$, to 99% thereof, and preferably, in the range 80% of the diameter $D_{41}$ to 95% thereof.

Depending on the characteristics of the wheel R, in particular its dimensions and the frequency of rotation at which it is designed to rotate at steady speeds, each short blade 22 may have a developed length lying in the range 50% of the developed length of a long blade 21 to 99% of the developed length of a long blade. The developed length of a long blade 21 can be measured between the points $A_{21}$ and $B_{21}$ or between the points $F_{21}$ and $G_{21}$. Similarly, the developed length of a short blade 22 can be measured between the points $A_{22}$ and $B_{22}$ or between the points $F_{22}$ and $G_{22}$. Preferably, the developed length of a short blade 22 lies in the range 70% of the developed length of a long blade 21 to 85% of the length of a long blade. Thus, if a long blade 21 has a developed length of 1 m, a short blade 22 can, for example, have a developed length of 0.8 m.

In order to guarantee good dynamic balancing of the wheel R, both the short blades 22 and the long blades 21 are distributed uniformly about the axis of rotation Z of the wheel R. In this example, the three short blades 22 are disposed on the band 1 with angular spacing $\alpha_{22}$ of 120° between them. Two long blades 21 are disposed at regular intervals between two consecutive short blades 22, with angular spacing of 40° for two adjacent long blades 21 and angular spacing of 80° for two long blades 21 between which a short blade 22 is disposed.

Figure 5:
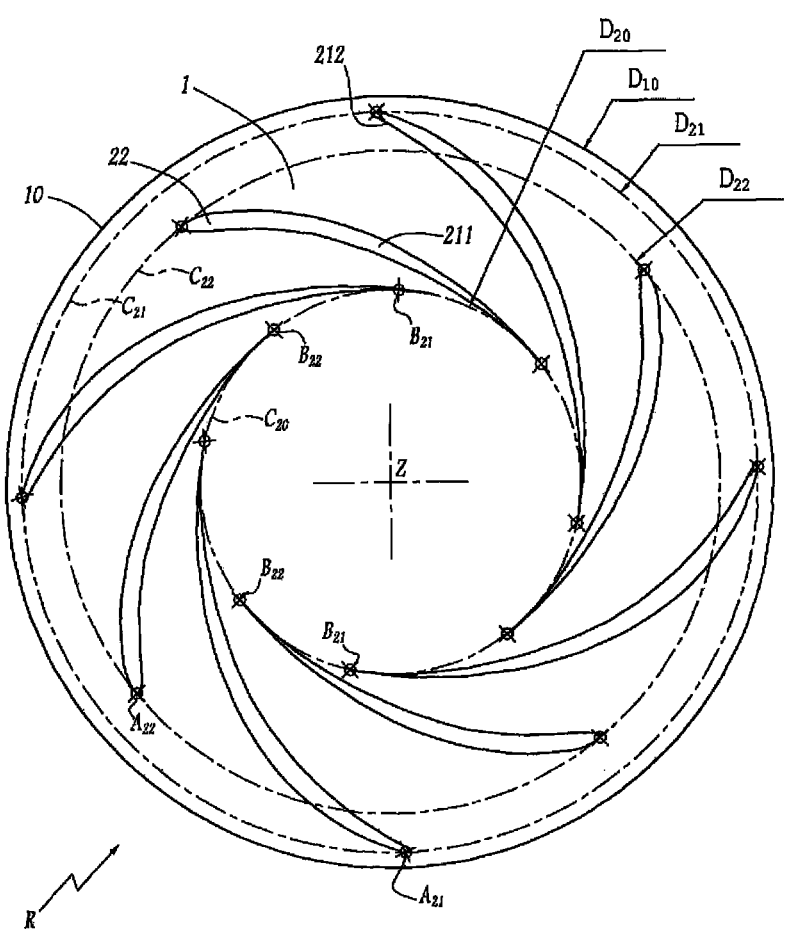
FIG. 5 is a diagrammatic section view of the wheel showing an even number of blades and wherein every other blade is a short blade.

With reference to FIG. 5, other distributions of the short and long blades are possible. It is thus possible to provide an even number of blades, e.g. ten blades, with every other blade being a short blade and the blades between them being long blades, both the short and the long blades being distributed uniformly about the axis of rotation of the wheel. In FIG. 5, eight blades are shown with every other blade being a short blade.

A wheel of the invention makes it possible to attenuate or even to avoid the radial forces generated on wheels having conventional blading, in particular at transient speeds when starting or stopping in turbine mode. It has been observed that, surprisingly, a wheel of the invention makes it possible to reduce the magnitude of the radial forces to which the wheel is subjected at transient speeds. By optimizing the shape of the blades of the wheel as a function of the use to be made thereof, it is possible to reduce that magnitude even further.

A hydraulic machine of the invention thus presents radial deflection of its wheel and of its shaft that is low or even zero. This thus reduces the costs of the hydraulic machine since it can be of small dimensions.

The invention is described herein with reference to a reversible hydraulic machine of the pump turbine type. However, the invention also applies to "simple" hydraulic machines of the turbine type.

The invention claimed is:

1. A wheel of a Francis type for a hydraulic machine designed to pass a forced flow of water, the wheel comprising:
    a band that is circular and symmetrical about an axis of rotation of the wheel;
    nine curved blades that extend from the band and each curved blade having an outside peripheral edge and an inside central edge;
    the band is connected to the inside central edges of the blades at connection points that are situated on a common circle that is centered on the axis and the band is connected to the outside peripheral edges of the blades at connection points that are situated on two distinct circles that are centered on the axis;
    wherein the blades include six long blades and three short blades, the long blades having connection points situated on a first of the two distinct circles, and the short blades being disposed on the band with an angular spacing of 120° and having connection points situated on a second of the two distinct circles having a diameter smaller than a diameter of the first circle.

2. The wheel according to claim 1, including a crown that is circular and symmetrical about the axis and which crown faces the band, the crown is connected to the inside central edges of the blades at connection points that are situated on a common circle centered on the axis, and the crown is connected to the outside peripheral edges of the blades at connection points that are situated on at least two other distinct circles that are centered on the axis.

3. The wheel according to claim 2, wherein the other two distinct circles that are centered on the axis include one circle having a first diameter and another circle having a second diameter smaller than the first diameter.

4. The wheel according to claim 2, wherein the short blades are distributed uniformly about the axis and the long blades are distributed uniformly about the axis.

5. The wheel according to claim 2, wherein each short blade has a length lying in a range of 50% to 99% of a length of a long blade.

6. The wheel according to claim 5 wherein a length of the short blades is equal to 70% of the length of the long blades.

7. A hydraulic machine, including a wheel according to claim 1.

8. An energy conversion installation, including at least one hydraulic machine according to claim 7.

* * * * *